US011468669B2

(12) United States Patent
Casas et al.

(10) Patent No.: US 11,468,669 B2
(45) Date of Patent: Oct. 11, 2022

(54) MAPPING SOIL PROPERTIES WITH SATELLITE DATA USING MACHINE LEARNING APPROACHES

(71) Applicant: Climate LLC, San Francisco, CA (US)

(72) Inventors: Angeles Casas, San Francisco, CA (US); Xiaoyuan Yang, Pleasanton, CA (US); Steven Ward, Moraga, CA (US)

(73) Assignee: Climate LLC, San Francisco, CA (US)

( * ) Notice: Subject to any disclaimer, the term of this patent is extended or adjusted under 35 U.S.C. 154(b) by 386 days.

(21) Appl. No.: 16/707,168

(22) Filed: Dec. 9, 2019

(65) Prior Publication Data
US 2020/0184214 A1 Jun. 11, 2020

Related U.S. Application Data

(60) Provisional application No. 62/778,268, filed on Dec. 11, 2018.

(51) Int. Cl.
G06K 9/00 (2022.01)
G06V 20/10 (2022.01)
A01C 21/00 (2006.01)
G06N 20/20 (2019.01)
A01B 79/00 (2006.01)

(52) U.S. Cl.
CPC .......... G06V 20/188 (2022.01); A01B 79/005 (2013.01); A01C 21/007 (2013.01); G06N 20/20 (2019.01); G06V 20/194 (2022.01)

(58) Field of Classification Search
CPC .... G06V 20/188; G06V 20/13; G06V 20/194; G06V 20/68; G06N 20/00; G06N 3/04; G06N 3/0481; G06N 3/08; G06N 3/084; G06N 5/02; G06N 5/04; G06N 7/005; G06T 3/0031; G06T 7/00; G06T 2207/10032;
(Continued)

(56) References Cited

U.S. PATENT DOCUMENTS 9,135,505 B2 9/2015 Padwick et al.
2011/0055220 A1 3/2011 Tyburski
(Continued)

OTHER PUBLICATIONS

The International Searching Authority, "Search Report" in application No. PCT/US19/65153, dated Feb. 10, 1010, 13 pages.
(Continued)

Primary Examiner — Alex Kok S Liew
(74) Attorney, Agent, or Firm — Morrison & Foerster LLP

(57) ABSTRACT

In an embodiment, a computer-implemented method for predicting subfield soil properties for an agricultural field comprises: receiving satellite remote sensing data that includes a plurality of images capturing imagery of an agricultural field in a plurality of optical domains; receiving a plurality of environmental characteristics for the agricultural field; generating a plurality of preprocessed images based on the plurality of satellite remote sensing data and the plurality of environmental characteristics; identifying, based on the plurality preprocessed images, a plurality of features of the agricultural field; generating a subfield soil property prediction for the agricultural field by executing one or more machine learning models on the plurality of features; transmitting the subfield soil property prediction to an agricultural computer system.

20 Claims, 9 Drawing Sheets

(58) Field of Classification Search
CPC . G06T 2207/20081; G06T 2207/20084; G06T 2207/30188
See application file for complete search history.

(56) References Cited

U.S. PATENT DOCUMENTS

2017/0083747 A1* 3/2017 Guan .................... G06V 20/13
2018/0027725 A1* 2/2018 Koutsorodi .......... A01C 21/005
2018/0146624 A1  5/2018 Chen et al.

OTHER PUBLICATIONS

Current Claims in application No. PCT/US19/65153, dated Feb. 2020, 5 pages.
International Bureau, "International Preliminary Report on Patentability", in application No. PCT/US2019/065153, dated Jun. 24, 2021, 7 pages.

* cited by examiner

Fig. 2
(a)
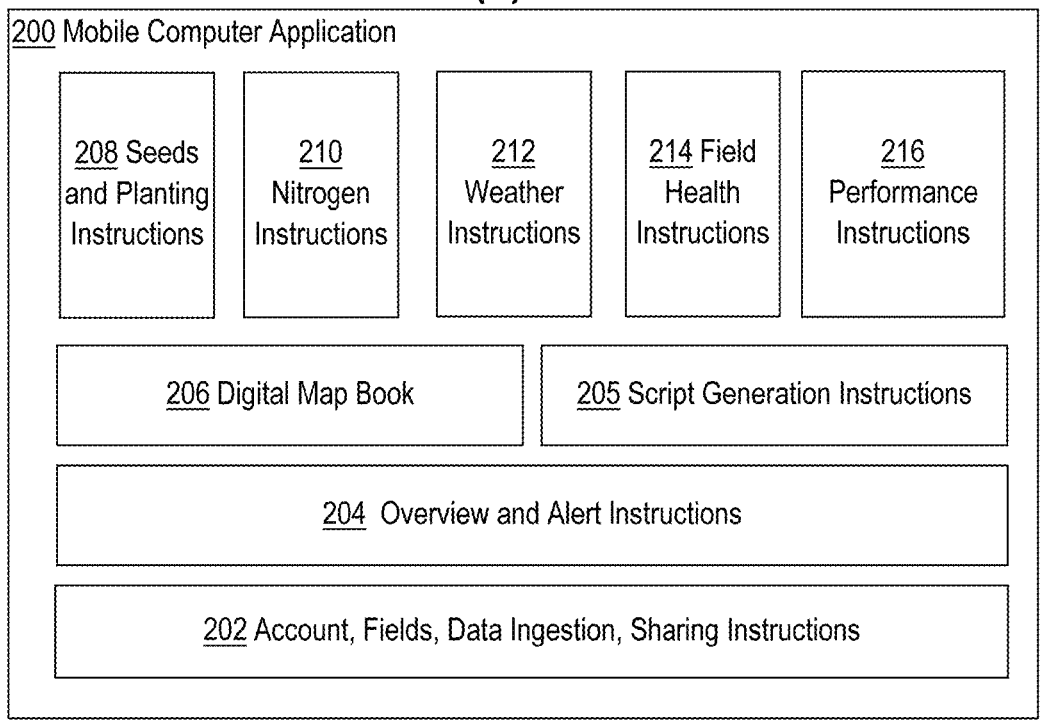
(b)
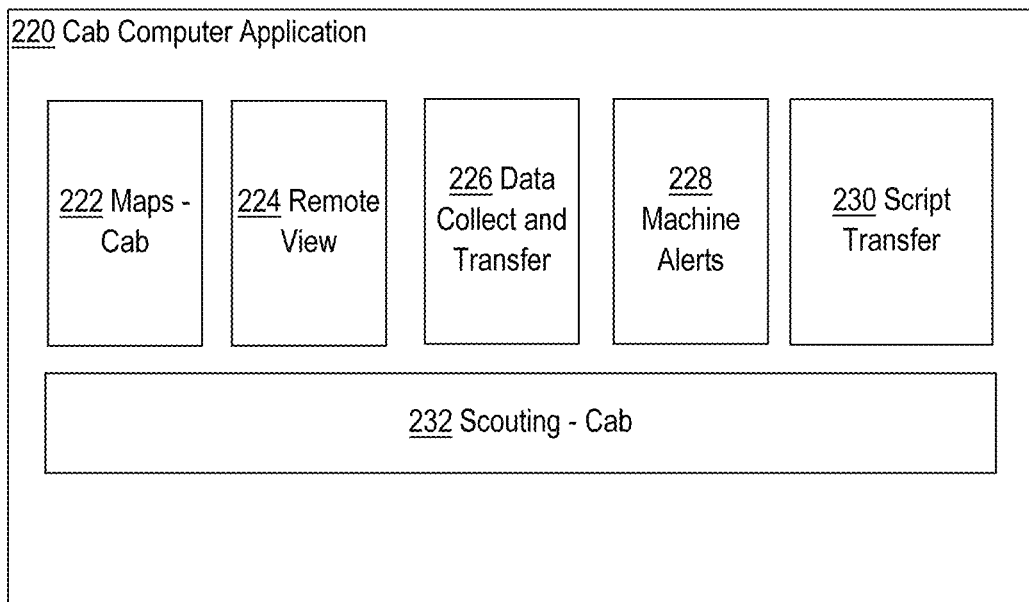

Fig. 6

| Index | Acronym | Formula |
|---|---|---|
| Modified Crop Residue Cover | MCRC | $\frac{R_{SWIR1} - R_{green}}{R_{SWIR1} + R_{green}}$ |
| Normalized Difference Tillage Index | NDTI | $\frac{R_{SWIR1} - R_{SWIR2}}{R_{SWIR1} + R_{SWIR2}}$ |
| Normalized Difference Water Index | NDWI | $\frac{R_{NIR} - R_{SWIR2}}{R_{NIR} + R_{SWIR2}}$ |
| Transformed Soil Adjusted Vegetation Index | TSAVI | $\frac{a(R_{NIR} - aR_{Red})}{a*R_{NIR} - R_{Red} - ab + X(1+a^2)}$ |

$a$: slope and $b$: intercept of soil line
$X = 0.08$

Fig. 8

MAPPING SOIL PROPERTIES WITH SATELLITE DATA USING MACHINE LEARNING APPROACHES

BENEFIT CLAIM

This application claims the benefit under 35 U.S.C. § 119 as a non-provisional of provisional application 62/778,268, filed on Dec. 11, 2018, the entire contents of which is hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2015-2018 The Climate Corporation.

FIELD OF THE DISCLOSURE

One technical field of the present disclosure is determining soil properties based on satellite data and using machine learning approaches.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Indicators of soil organic matter and indicators of cation exchange capacity are important sources of information about the soil quality. Soil organic matter (SOM) usually includes plant and animal detritus at various stages of decomposition. It may also include cells and tissues of soil microbes, and substances that soil microbes synthesize. SOM provides nutrients to crops as it decomposes and increases nutrient-holding capacity in the soil. Cation-exchange capacity (CEC) is a measure of how many cations can be retained on the soil particle surfaces. CEC is used to determine the ability of the soil to hold nutrients and indicates fertility of the soil. Soil properties, particularly SOM and CEC, are critical yield impacting factors because they are major reasons for the subfield variability in crop yields and crop response to farm practices. Other soil properties such as pH, P, K, Mg, and Ca are also important sources of information for understanding the crop and soil nutrient conditions.

However, quantitative and absolute measurements of soil properties usually involve implementing intensive and expensive soil sampling strategies. The strategies may include soil core sampling which usually is hard to scale. In addition, spatially distributed maps generated based on point-based soil samples usually rely on challenging and inaccurate interpolation techniques.

Some of these problems may be overcome by implementing expensive and time-consuming proximal sensor techniques. The techniques may utilize, for example, VERIS and SmartFirmer data. The techniques, however, require performing an extensive instrument and data calibration and point-based soil sampling. Furthermore, the techniques may be limited to areas that have been already surveyed. Other efforts to obtain the subfield SOM variability data have been using airborne data. These efforts are usually implemented at a small scale and for a small number of fields.

However, there has been no specific image-based effort undertaken to map the soil properties, such as pH, P, K, Mg, and Ca before.

SUMMARY

The appended claims may serve as a summary of the disclosure.

BRIEF DESCRIPTION OF THE DRAWINGS

In the drawings:

FIG. 2 illustrates two views of an example logical organization of sets of instructions in main memory when an example mobile application is loaded for execution.

FIG. 6 depicts an example embodiment of a spreadsheet view for data entry.

FIG. 8 depicts examples of vegetation indices.

DETAILED DESCRIPTION

Figure 1:
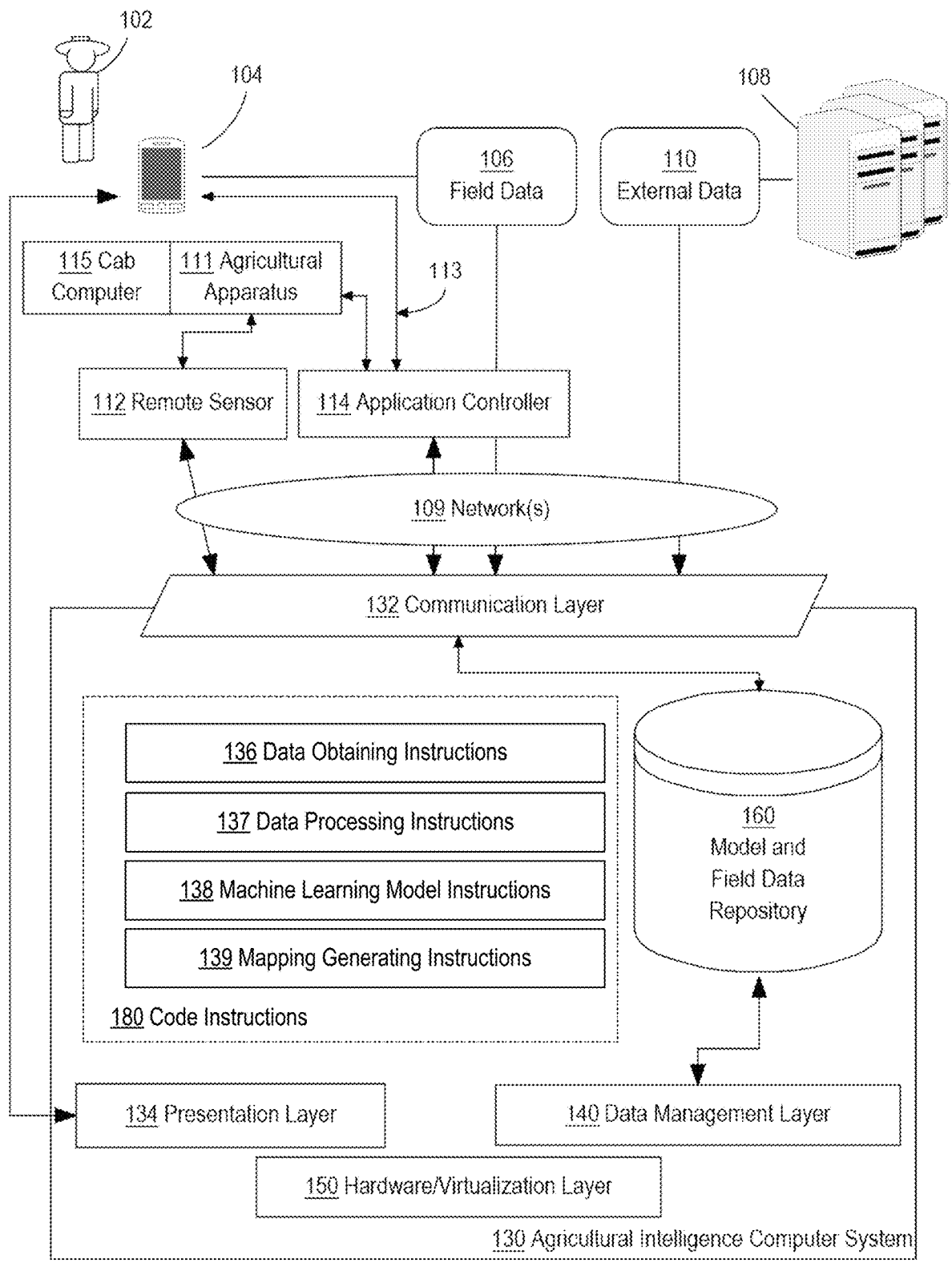
FIG. 1 illustrates an example computer system that is configured to perform the functions described herein, shown in a field environment with other apparatus with which the system may interoperate.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:
  1. GENERAL OVERVIEW
  2. EXAMPLE AGRICULTURAL INTELLIGENCE COMPUTER SYSTEM
    2.1. STRUCTURAL OVERVIEW
    2.2. APPLICATION PROGRAM OVERVIEW
    2.3. DATA INGEST TO THE COMPUTER SYSTEM
    2.4. PROCESS OVERVIEW—AGRONOMIC MODEL TRAINING
    2.5. IMPLEMENTATION EXAMPLE—HARDWARE OVERVIEW 3. EXAMPLE PROCESS FOR GENERATING SOIL PROPERTY DATA
   3.1. PROVIDING BOUNDARY DATA
   3.2. OBTAINING DATA FOR A FIELD
      3.2.1. OBTAINING DATA FROM A SATELLITE
      3.2.2. ACCESSING ENVIRONMENTAL COVARIATES
   3.3. DATA PREPROCESSING
      3.3.1. ATMOSPHERIC-BASED DATA CORRECTION
      3.3.2. BARE-SOIL-PIXEL CORRECTION
      3.3.3. NORMALIZATION AND FALSE POSITIVES FILTERING
      3.3.4. CALCULATING SPECTRAL INDICES
   3.4. EXECUTING MACHINE LEARNING MODELS
      3.4.1. MODEL ACCURACY OF EXAMPLE ML MODELS
      3.4.2. SOIL ORGANIC MATTER MAPPING
      3.4.3. SCALING OF AN SOM MODEL
      3.4.4. EXAMPLE FLOW CHART
4. IMPROVEMENTS PROVIDED BY CERTAIN EMBODIMENTS 1. General Overview In an embodiment, an approach for generating a mapping of soil properties based on various types of data and using machine learning models is described. The approach may be based on non-parametric data-driven methodologies for determining the mapping based on satellite-based and other data.

The subfield soil properties may include, for example, soil organic matter (SOM). The SOM may be measured as, for example, a fraction (%) of the organic matter included in a particular soil sample. The soil properties may also include a cation exchange capacity (CEC) measure. Cation-exchange capacity indicates how many molecules (cations) may be retained on soil particle surfaces. Since negative charges on the surfaces of soil particles bind the positively-charged molecules, the bound molecules may be lost when, for example, they are exchanged with some positively charged particles in the surrounding soil water. Hence, the measure of CEC may be a helpful indication of the soil health. The CEC is usually defined as the amount of positive charge that can be exchanged per mass of soil, and it is usually measured in cmol/kg.

Other soil properties may also include levels of the soil potential of hydrogen (pH), potassium (K), phosphorous (P), magnesium (Mg), and calcium (Ca). These are usually measured in ppm.

A map of subfield soil properties may be determined based on different types of data, including satellite data, topographic-based layers data, weather features data, and the like. The satellite data may be remotely sensed and may represent spectral features of the soil. The data may be combined with the absolute point-based soil sampling measurements, and the topographic and weather features.

In an embodiment, the combined data is ported to a one or more machine learning (ML) models. A model may be a non-parametric model, or similar. The model may be first trained on training data, and then deployed to process newly collected data to generate a mapping of the SOM, CEC and other soil properties such as pH, P, K, Mg, and Ca. The mapping may be determined with a relatively high resolution and accuracy. The mapping may represent the soil properties for different topologies and different points in time.

The approach may be useful in various agronomical practices. For example, the approach may be useful in identifying management zones for agricultural fields for the purpose of determining recommendations for the fields. Based on the identified zones, a computer system may automatically generate one or more agricultural prescriptions for each management zone. The prescription may include scripts for seeding rate and hybrids, seed placement, variable rate nitrogen scripts, variable rate crop protection, soil sampling, and irrigation management and diagnosing yield stressors.

In an embodiment, an approach allows predicting various soil properties for a field using non-parametric ML models. Examples of non-parametric models include a Gaussian Process Regression (GPR) model. One of the benefits of employing a GPR model is that the model not only provides the predicted magnitudes for the model outputs, but also provides the uncertainty measures for the predicted magnitudes. Additional models implemented in this approach may include a Random Forest (RF) model, a deep learning model, and the like.

An ML model may be configured to receive model inputs and to generate model predictions. In some embodiments, the inputs may include processed images derived from satellite remote sensing data that may include data collected for different optical bands and spectrums. This may include, for example, data collected in the visible (VIS) spectrum, near-infrared spectrum, and short-wave-infrared (SWIR) spectrum.

Input data may be obtained from, for example, the Landsat 8 satellite in the form of Landsat 8-operational land imager (Landsat-8-OLI) data. The Landsat-8-OLI data may be sampled at, for example, 30-meter-resolution. The input data may be also obtained from the European optical imaging satellites Sentinel-2A and Sentinel-2 B. That data is referred to as Sentinel data and is usually sampled at 10/20-meter resolution.

An ML model may be also configured to accept data inputs implemented as environmental variables. The variables may represent topographic-based features such as a slope, elevation, aspect, curvature, profile curvature, planform curvature and different curvatures and flow accumulation data. Other environmental variables may represent, for example, a measure of accumulated precipitation and temperature within a certain time period for which the satellite data was collected, long-term average temperature and precipitation, absolute point-based soil sampling measurements of the soil property, and the like.

In an embodiment, an approach for generating a mapping of soil properties includes training an ML model using various types of data including weather-dependent data. The training usually improves the accuracy of the predictions generated by the ML model. By training the model for the weather-dependent soil conditions with multi-temporal image-based features and according to the temporal dynamic pattern of the soil properties, the accuracy of the predicted soil properties is usually greatly improved in comparison with the results provided using other approaches.

In an embodiment, the approach provides robust mechanisms for predicting the soil properties with a relatively high accuracy and scalability. The approach may be, for example, easily scaled across multiple geographical regions and multiple delineation zones.

2. EXAMPLE AGRICULTURAL INTELLIGENCE COMPUTER SYSTEM

2.1. Structural Overview

FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) chemical application data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may actually be incorporated within the system 130.

An agricultural apparatus 111 may have one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, aerial vehicles including unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines, harvesters, sprayers, and cultivators. Application controller 114 is communicatively coupled to agricultural intelligence computer system 130 via the network(s) 109 and is programmed or configured to receive one or more scripts that are used to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used. Sensor data may consist of the same type of information as field data 106. In some embodiments, remote sensors 112 may not be fixed to an agricultural apparatus 111 but may be remotely located in the field and may communicate with network 109.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a graphical screen display, such as a color display, that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, code instructions 180, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object-oriented databases, distributed databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

Code instructions 180 may include data obtaining instructions 136, data processing instructions 137, machine learning model instructions 138, mapping generating instructions 139, and other instructions. Data obtaining instructions 136 may include instructions for receiving various types of image data for an agricultural field, including satellite digital images, on-ground collected image data, image data received from national and/or research agricultural databases, and the like.

Data processing instructions 137 may include instructions for preprocessing various types of image data. Instructions 137 may be configured to, for example, perform atmospheric correction to the satellite images, filter out images, detect image data outliers, reprojection data, perform data interpolation, perform data subsampling, and the like.

Machine learning model instructions 138 may include instructions for training one or more ML models for determining soil property for a field based on input imagery, porting input images to the ML models to generate predictions of the soil property based on the input images, output the predictions and, optionally, measures indicating the quality of the predictions.

Mapping generating instructions 139 may include instructions for receiving the predictions of the soil properties for an agricultural field from one or more ML models, using the predictions received from the one or more ML models to generate one or more digital maps depicting soil properties for the agricultural field.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U. S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 5:
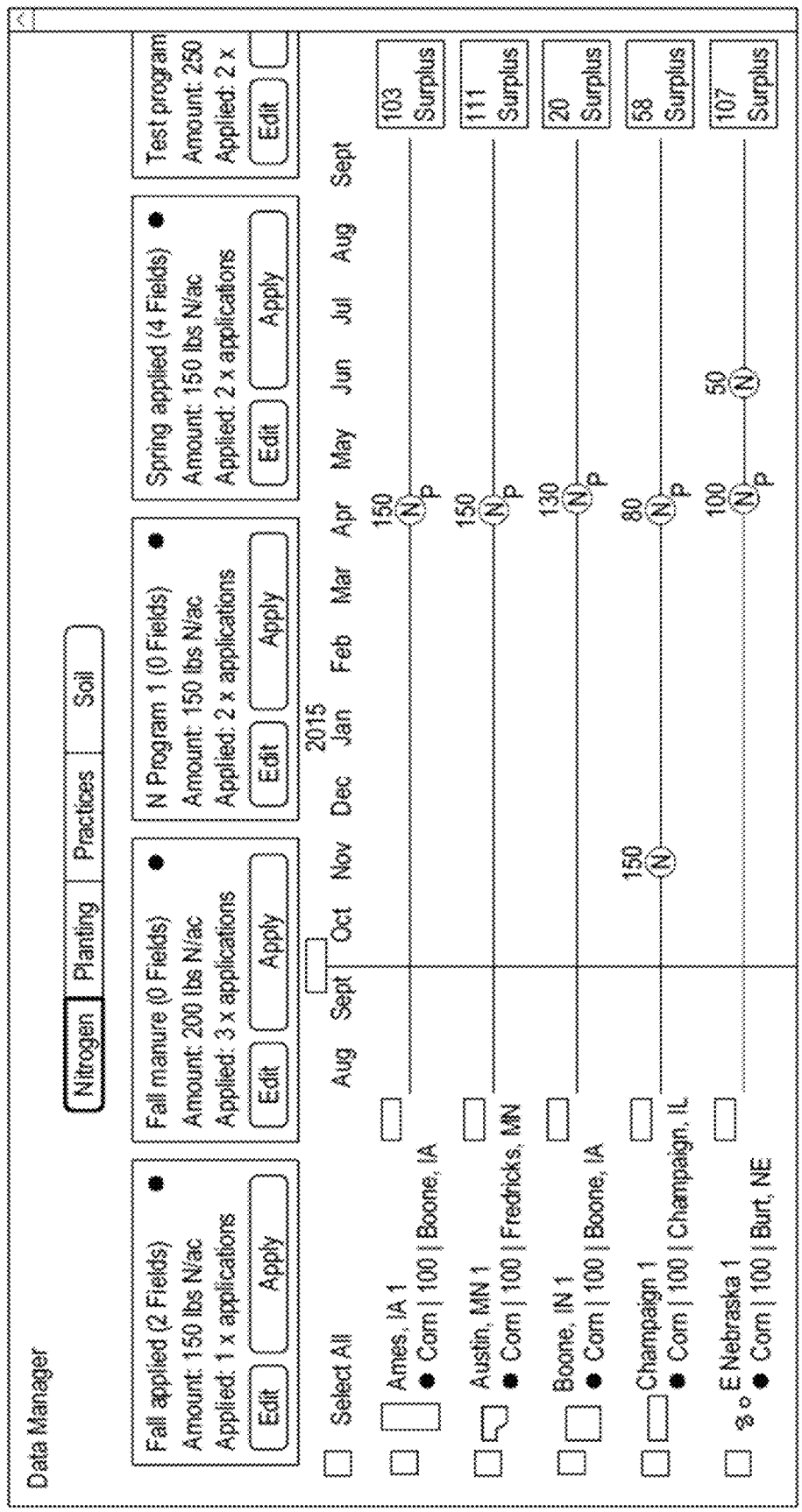
FIG. 5 depicts an example embodiment of a timeline view for data entry.

FIG. 5 depicts an example embodiment of a timeline view for data entry. Using the display depicted in FIG. 5, a user computer can input a selection of a particular field and a particular date for the addition of event. Events depicted at the top of the timeline may include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 5, the top two timelines have the "Spring applied" program selected, which includes an application of 150 lbs. N/ac in early April. The data manager may provide an interface for editing a program. In an embodiment, when a particular program is edited, each field that has selected the particular program is edited. For example, in FIG. 5, if the "Spring applied" program is edited to reduce the application of nitrogen to 130 lbs. N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 5, the interface may update to indicate that the "Spring applied" program is no longer being applied to the top field. While the nitrogen application in early April may remain, updates to the "Spring applied" program would not alter the April application of nitrogen.

Figure 6:
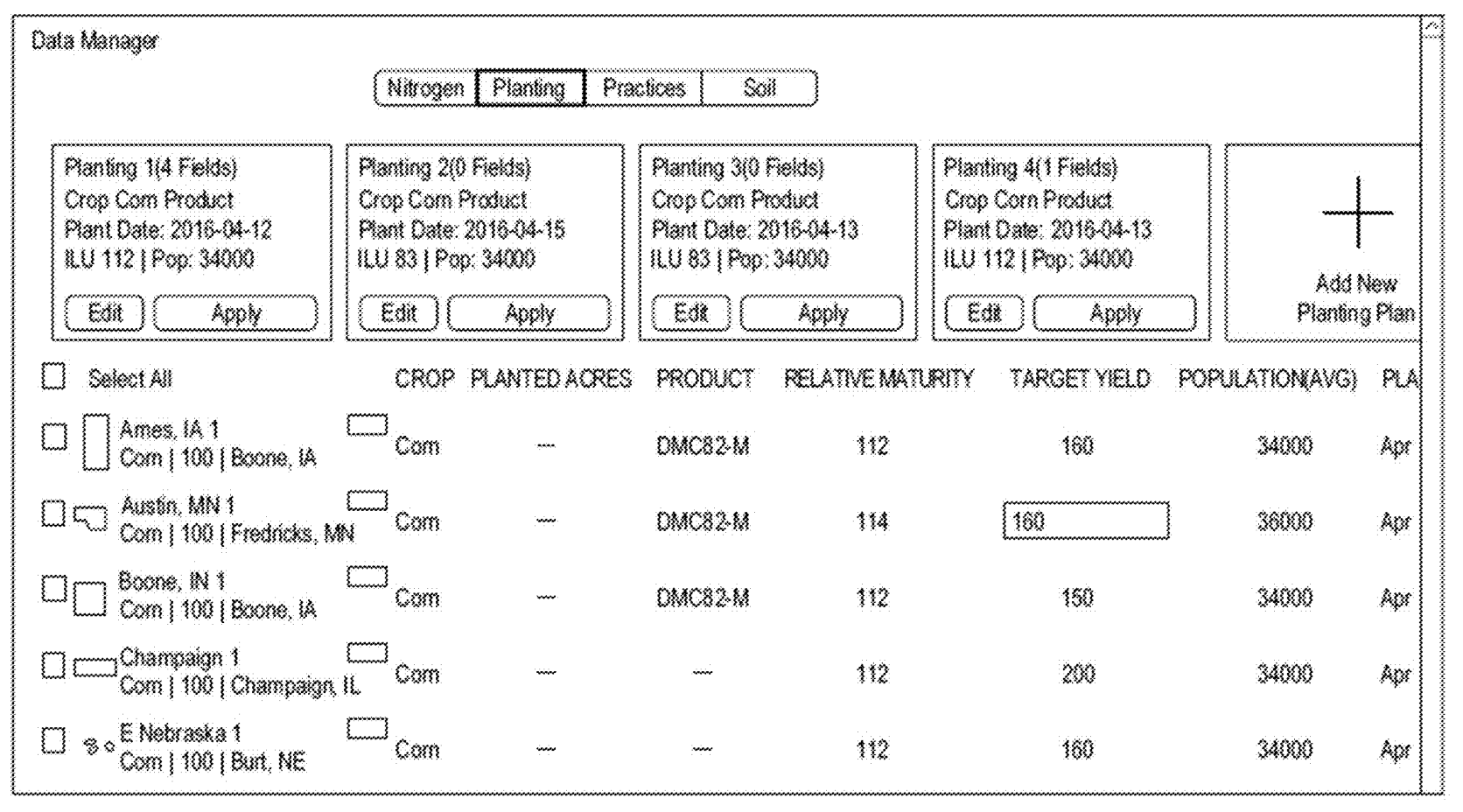

FIG. 6 depicts an example embodiment of a spreadsheet view for data entry. Using the display depicted in FIG. 6, a user can create and edit information for one or more fields. The data manager may include spreadsheets for inputting information with respect to Nitrogen, Planting, Practices, and Soil as depicted in FIG. 6. To edit a particular entry, a user computer may select the particular entry in the spreadsheet and update the values. For example, FIG. 6 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored or calculated output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

In an embodiment, each of instructions 180 comprises a set of one or more pages of main memory, such as RAM, in the agricultural intelligence computer system 130 into which executable instructions have been loaded and which when executed cause the agricultural intelligence computer system to perform the functions or operations that are described herein with reference to those modules. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, each of instructions 180 also may represent one or more files or projects of source code that are digitally stored in a mass storage device such as non-volatile RAM or disk storage, in the agricultural intelligence computer system 130 or a separate repository system, which when compiled or interpreted cause generating executable instructions which when executed cause the agricultural intelligence computer system to perform the functions or operations that are described herein with reference to those modules. In other words, the drawing figure may represent the manner in which programmers or software developers organize and arrange source code for later compilation into an executable, or interpretation into bytecode or the equivalent, for execution by the agricultural intelligence computer system 130.

Figure 4:
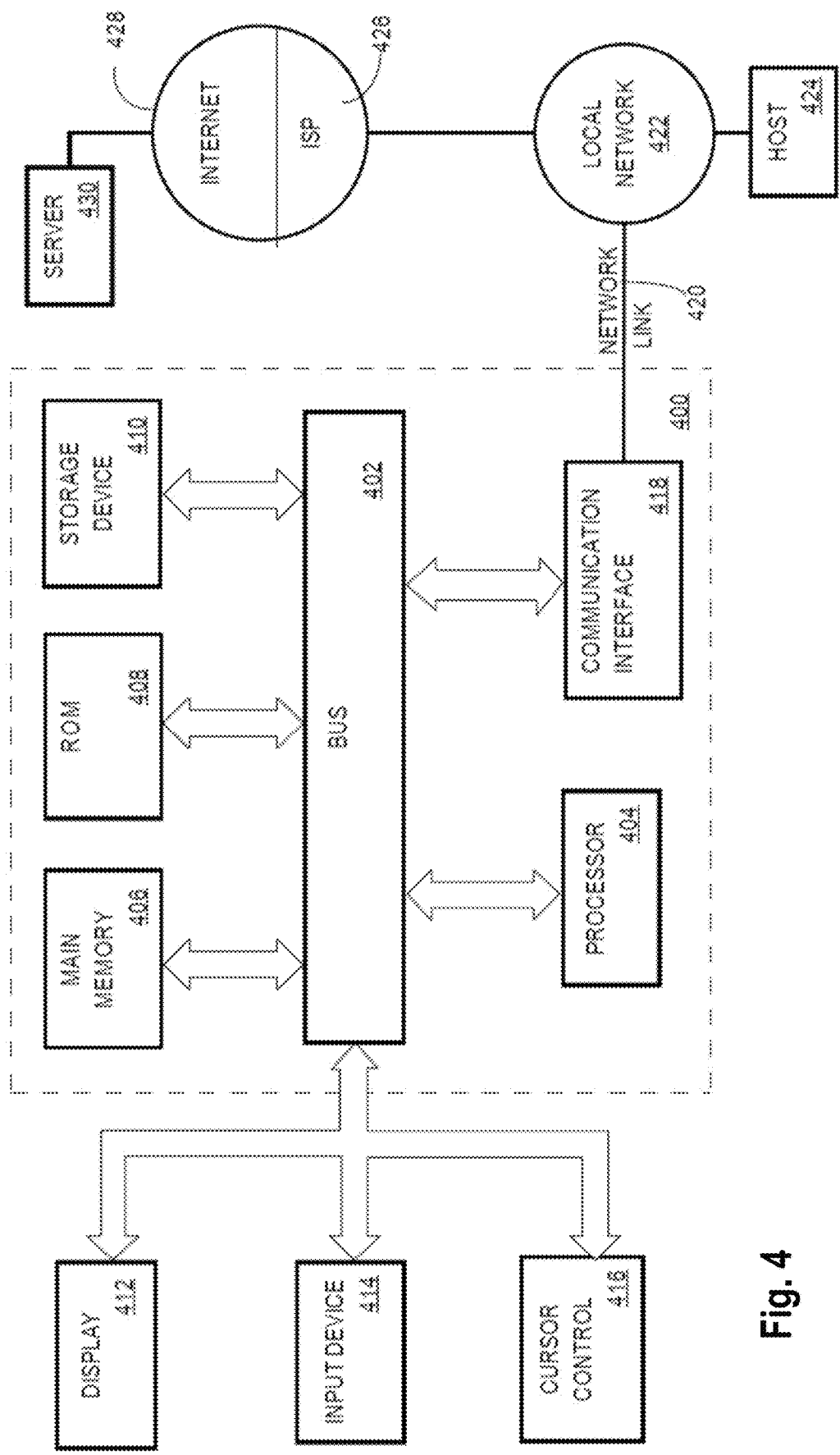
FIG. 4 is a block diagram that illustrates a computer system upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of smart phones, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), Wi-Fi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114 which include an irrigation sensor and/or irrigation controller. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account, fields, data ingestion, sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS)

exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally, and/or alternatively, a script may be sent directly to cab computer 115 from mobile computer application 200 and/or uploaded to one or more data servers and stored for further use.

In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of fertilizer application zones and/or images generated from subfield soil data, such as data obtained from sensors, at a high spatial resolution (as fine as millimeters or smaller depending on sensor proximity and resolution); upload of existing grower-defined zones; providing a graph of plant nutrient availability and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields and/or zones that have been defined in the system; example data may include nitrogen application data that is the same for many fields and/or zones of the same grower, but such mass data entry applies to the entry of any type of field data into the mobile computer application 200. For example, nitrogen instructions 210 may be programmed to accept definitions of nitrogen application and practices programs and to accept user input specifying to apply those programs across multiple fields. "Nitrogen application programs," in this context, refers to stored, named sets of data that associates: a name, color code or other identifier, one or more dates of application, types of material or product for each of the dates and amounts, method of application or incorporation such as injected or broadcast, and/or amounts or rates of application for each of the dates, crop or hybrid that is the subject of the application, among others. "Nitrogen practices programs," in this context, refer to stored, named sets of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium), application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, yield differential, hybrid, population, SSURGO zone, soil test properties, or elevation, among others. Programmed reports and analysis may include yield variability analysis, treatment effect estimation, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 232 may be programmed to display location-based alerts and information received from the system 130 based on the location of the field manager computing device 104, agricultural apparatus 111, or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or Wi-Fi-based position or mapping apps that are programmed to determine location based upon nearby Wi-Fi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus; other electromagnetic radiation emitters and reflected electromagnetic radiation detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

In an embodiment, sensors 112 and controllers 114 may comprise weather devices for monitoring weather conditions of fields. For example, the apparatus disclosed in U.S. Provisional Application No. 62/154,207, filed on Apr. 29, 2015, U.S. Provisional Application No. 62/175,160, filed on Jun. 12, 2015, U.S. Provisional Application No. 62/198,060, filed on Jul. 28, 2015, and U.S. Provisional Application No. 62/220,852, filed on Sep. 18, 2015, may be used, and the present disclosure assumes knowledge of those patent disclosures.

2.4. Process Overview-Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, fertilizer recommendations, fungicide recommendations, pesticide recommendations, harvesting recommendations and other crop management recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge or sensor providing weather data at the same or nearby location or an estimate of nitrogen content with a soil sample measurement.

Figure 3:
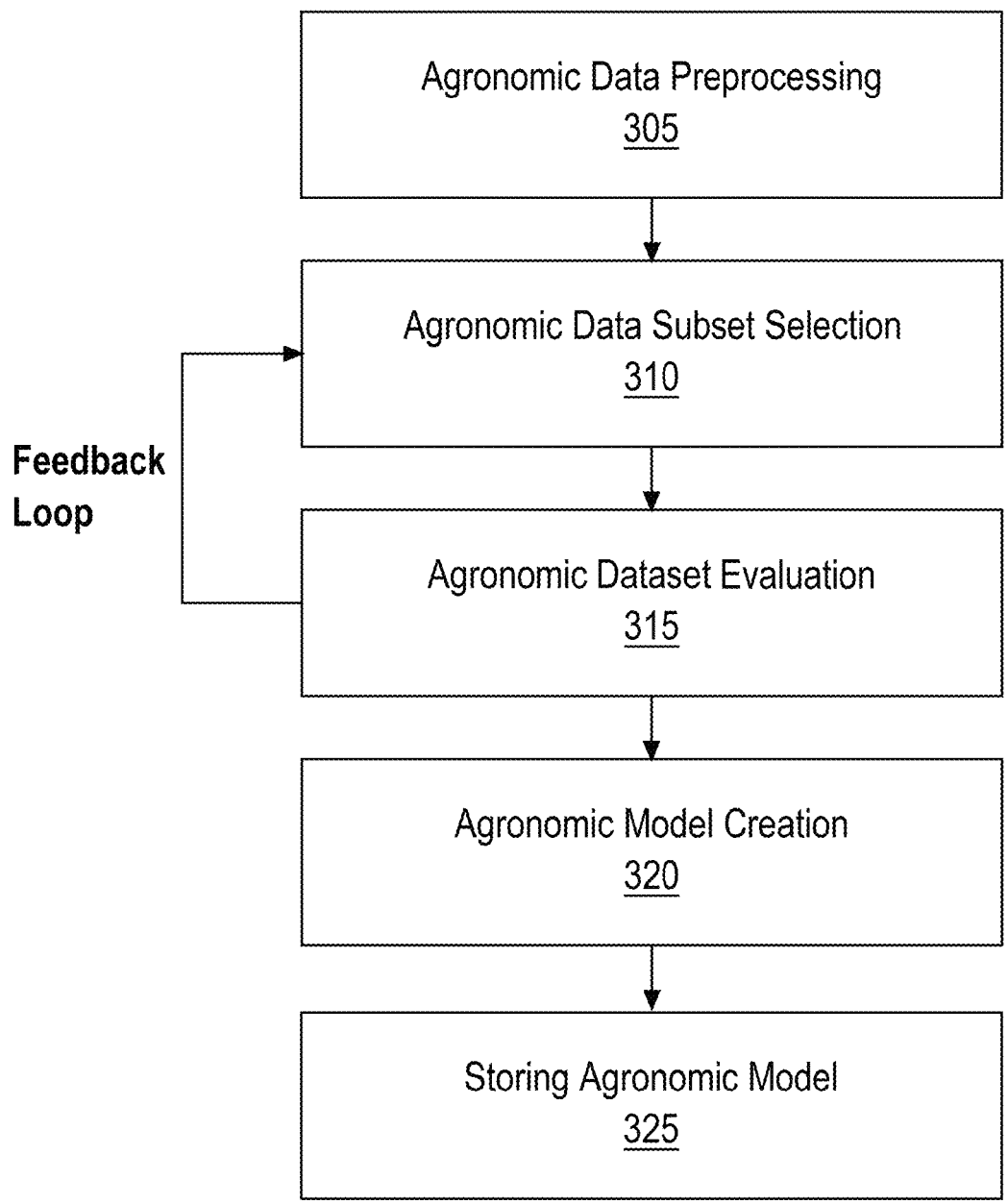
FIG. 3 illustrates a programmed process by which the agricultural intelligence computer system generates one or more preconfigured agronomic models using agronomic data provided by one or more data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise, distorting effects, and confounding factors within the agronomic data including measured outliers that could adversely affect received field data values. Embodiments of agronomic data preprocessing may include, but are not limited to, removing data values commonly associated with outlier data values, specific measured data points that are known to unnecessarily skew other data values, data smoothing, aggregation, or sampling techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared and/or validated using one or more comparison techniques, such as, but not limited to, root mean square error with leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random-access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infrared data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated-services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world-wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3. Example Process for Generating Soil Property Data

In an embodiment, a non-parametric data-driven method for mapping subfield soil properties for agricultural fields is presented. The method allows determining, or predicting, various properties of the subfield soil. The properties may include SOM levels measured as a fraction of the soil (%), CEC levels measured in cmol/kg, and measures of other properties such as levels of pH, K, P, Mg, Ca, and others.

The soil information may be determined based on optical satellite imagery data, topographic soil layer data, and weather condition data. The remotely sensed satellite spectral feature data, soil sampling measurements, topographic data and weather feature data may be processed using one or more machine learning non-parametric models to generate predictions of the SOM, CEC, pH, K, P, Mg, and Ca properties of the subfield soil.

In an embodiment, the predictions of the subfield soil properties may be used to generate maps for the agricultural fields. The maps may be used to, for example, identify management zones for the fields, and to determine seeding rates and hybrids for the fields. Furthermore, the maps may be used to generate variable rate nitrogen scripts for the fields, seed placement scripts for the fields, variable rate crop protection scripts for the fields, soil sampling scripts, and irrigation management and diagnosing yield instructions for the fields.

Figure 7:
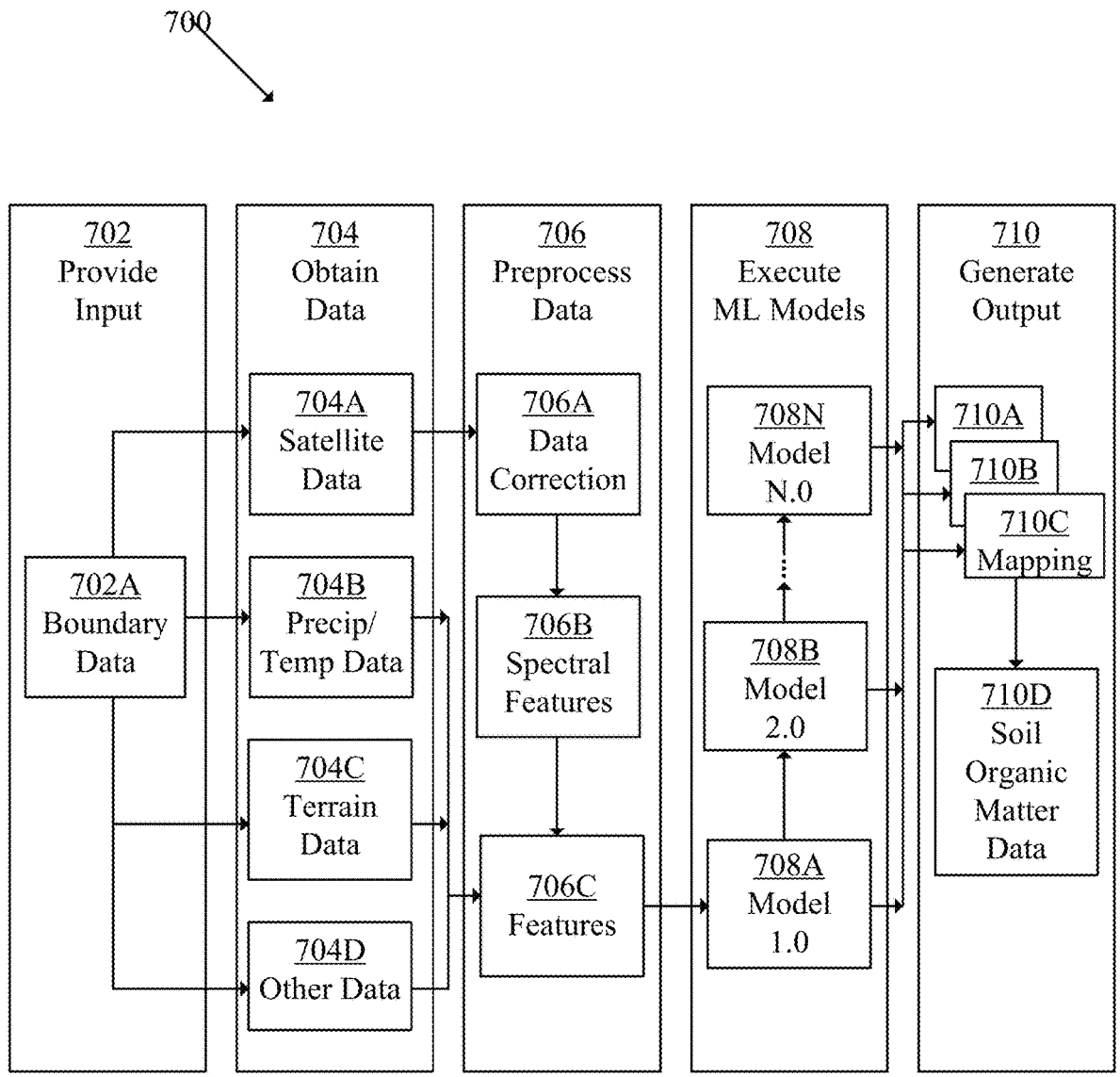
FIG. 7 depicts an example process for generating soil property data using a machine learning approach.

FIG. 7 depicts an example process for generating soil property data using a machine learning approach. In an embodiment, a process 700 for generating soil property data using a ML approach comprises providing boundary data, obtaining data for a field, preprocessing the data, executing ML models, and generating output containing subfield soil property data for the field.

3.1. Providing Boundary Data

In an embodiment, process 700 comprises providing (702) input for specifying, for example, a boundary of an agricultural field, or fields, for which subfield soil property data is sought. The input may include, for example, a specification of boundary data 702A for the field. Boundary data 702A may be specified by providing longitudinal and latitudinal coordinate values for each end point of each edge of the field boundary. Other ways of providing boundary data 702A may also be implemented.

3.2. Obtaining Data For a Field

In an embodiment, process 700 comprises obtaining (704) data for the field for which boundary data 702A has been provided and for which subfield soil property data is sought. The data may include satellite data 704A, temperature and precipitation data 704B, terrain data 704C, and any other data that may be helpful in generating the soil property data for the field.

Data 704A-D may be requested using a variety of approaches. In one approach, the data may be requested by providing boundary data 702A that specifies the boundary for the field to one or more satellite servers, national databases, and/or research data repository.

Satellite data 704A for agricultural fields may be obtained from satellites such as the Landsat 8, Sentinel-2 A and B. The obtained data may include multi-spectral data depicting the field imagery.

Precipitation data 704B for agricultural fields may be obtained from various national climatology data repositories, research centers, agricultural laboratories, and the like.

Terrain data 704C for agricultural fields may be obtained from various national geological data repositories, research centers, agricultural laboratories, and the like.

Other data 704D may include ground measurements. Optionally, or in addition to, the data may include imagery data, such as digital images collected on the ground using image capturing devices, such as digital cameras, sensors and the like.

3.2.1. Obtaining Data from a Satellite

Satellite data 704A for agricultural fields may be obtained from satellites. The satellite data may include weather and climate data for each field for which a mapping of soil properties is sought. Examples of satellites that may be configured to provide such data include the Landsat 8, Sentinel-2A and Sentinel-2 B.

Sentinel-2 Multi-Spectral Instrument (MSI) satellite is an optical pushbroom sensor that acquires multi-spectral data depicting agricultural fields. The multi-spectral data may include, for example, 13 spectral bands from the visible (VIS) spectrum and near-infrared (NIR) spectrum to short-wave-infrared (SWIR) spectrum. The data may be provided at a spatial resolution, such as 10 m, 20 m and 60 m, and 12-bit quantization.

The MSI sensor may be configured to provide enhanced spectral capabilities to provide additional and useful bands for agricultural fields and atmospheric conditions for the fields. Examples of the additional bands include the deep blue band (443 nm) for capturing and representing coastal areas and areas covered by atmospheric-aerosol discharge. The enhanced capabilities may also include the cirrus-type-cloud detection at, for example, 1375 nm band, the three red-edge bands for detecting vegetation and presence of water, and SWIR bands for the soil properties retrieval.

The MSI data may be acquired using the sentinelsat python API configured to perform a search, download, and retrieval of the data from the Copernicus Open Access Hub. The Copernicus Open Access Hub (previously known as Sentinels Scientific Data Hub) provides complete, free and open access to Sentinel-1, Sentinel-2, Sentinel-3 and Sentinel-5P user products, include the In-Orbit Commissioning Review (IOCR) data.

3.2.2. Accessing Environmental Covariates

In addition to obtaining spectral data and indices, various geospatial datasets relevant to soil formation may be obtained and used in a process for generating a mapping of subfield soil properties. The geospatial datasets may be used to build a stack of environmental covariates for a predictive soil modeling. The environmental covariates may be, for example, sourced at 10 m resolution and/or warped to facilitate a bicubic resampling in the Geospatial Data Abstraction Library (GDAL).

The GDAL is a computer software library for reading and writing data in the raster and vector geospatial data formats. The GDAL is released under the permissive X/MIT style free software license by the Open Source Geospatial Foundation.

In an embodiment, the environmental covariates include Digital Elevation Model (DEM)-based covariates for the elevation, slope gradient, aspect, curvature, profile curvature, planform curvature data. The data may be estimated from the 3D Elevation Program (3DEP) that may be available at the USGS website.

The environmental covariates may also include climate covariates representing the accumulated precipitation and temperature within a certain time period, such as a few days or weeks. The time periods usually include the period for which the corresponding satellite data has been obtained for the agricultural field. As well as the long-term average daily temperature and precipitation. This data may be obtained from a commercially available or publicly available service that provides digital weather data. The data may be warped to the 10 m resolution corresponding to the Sentinel-based satellite data.

3.3. Data Preprocessing

In an embodiment, process 700 comprises preprocessing (706) of data collected for an agricultural field. The preprocessing may include removing and/or correcting the data points in the satellite imagery data that represent outliers and/or contaminated data. For example, the preprocessing may include removing those data points that correspond to the areas in the fields that happened to be obscured by clouds, snow, and the like, as well as removing those data points that correspond to the areas that happened to be vegetation-free regions, such as highways, buildings, and the like. The resulting data is referred to as preprocessed data.

3.3.1. Atmospheric-Based Data Correction

In an embodiment, data preprocessing 706 includes performing, among other things, a correction of atmospheric-based data. This may include detecting the depictions of clouds and classifying the images based on the detection. For example, the digital images may be processed to identify those images that include pixels that depict clouds, and classifying those images as having a rather limited usability in determining the soil property.

In a next step, data indicating thickness of the clouds and water depicted in the classified images may be retrieved. That data may be retrieved from, for example, the Aerosol Optical Thickness and the Water Vapour (WV) data content repository.

The classified images and the clouds/water thickness data may be used to generate, for example, surface reflectance data. This may be performed using, for example, the Sen2Cor-based MODIS/6S approach to produce a bottom-of-atmosphere (BoA) surface reflectance map. The process may also utilize data available from, for example, the data repositories storing Radiative Transfer Look-Up Tables. The outputs may include a scene classification structured control language (SCL) image data. The SCL image data may be combined with the Quality Indicators for the cloud and snow probabilities information. AOT and WV maps and the surface (or BoA) reflectance images may be provided at different spatial resolutions, such as 60 m, 20 m, and 10 m resolutions.

3.3.2. Bare-Soil-Pixel Correction

SCL images may be processed to identify the images that depict bare soil and no clouds and snow. The identified images are used to predict subfield soil properties.

In an embodiment, the images are processed to ensure that the images depict snow-free fields. An image may be also processed to identify the image pixels that depict clouds and shadows. The cloud/shadow detection may be performed using digital-objects detection tools, such as the Popcorn-III tool. The fields with pixels identified as corresponding to the depictions of clouds and/or shadows are not used in the further processing. The snow pixels may be identified using, for example, the Normalised Difference Snow Index (NDSI) program. The program may analyze each pixel in the image and determine a probability that the pixel does not correspond to the depictions of snow. The pixels for which the probability is less than, for example, 0.2 may be removed or identified is not to be used.

The processed SCL images may be divided into several classes. For example, the SCL images may be divided into eleven classes, including: class 0: no data; class 1: saturated pixels; class 2: dark features/shadows; class 3: cloud shadows; class 4: vegetation; class 5: bare soils; class 6: water; class 7: cloud low probability; class 8: cloud medium probability; class 9: cloud high probability; class 10: cirrus clouds; class 11: snow or ice. Usually, only those images, or pixels of the images, that depict bare soil, are validated and used in the presented approach. Other pixels and/or images may be marked as unusable.

3.3.3. Normalization and False Positives Filtering

In an embodiment, a Bare Soil Index (BSI) is used to filter out the images for which bare soil false positive values have been determined. The BSI is a numerical indicator that combines blue, red, near infrared and short wave infrared spectral bands to capture soil variations. The spectral bands may be used in a normalized manner. For example, the short-wave infrared and the red spectral bands may be used to quantify the soil mineral composition, while the blue and the near infrared spectral bands may be used to enhance the presence of vegetation. The BSI can be used in numerous remote sensing applications, like soil mapping, crop identification (in combination with NDVI), and the like.

In an embodiment, to calculate a BSI for a green spectral band, the following formula may be used:

$$BSI = \frac{R_{green} - R_{SWIR1}}{R_{green} + R_{SWIR1}} \quad (1)$$

The BSI may be also expressed as a combination of a normalized vegetation index (NDVI) and the normalized differenced built-up index (NDBI). In an embodiment the BSI index may be used to map and monitor bare soil areas.

While the equation (1) uses the SWIR1, in other embodiments, a SWIR2 may be used since it may perform better than a minimum NDVI threshold in terms of confusion with vegetation shadows, cloud shadows and low hanging clouds. Values may range between −1 and 1, where a higher value indicates a higher change on bare soil. Any pixel with the BSI value smaller than 0.02 may be eliminated from the modelling process as potentially not depicting bare soil.

In an embodiment, a normalized different shown index (NDSI) may be computed using the following equation:

$$NDSI = \frac{(R_{SWIR2} + R_{red}) - (R_{NIR} + R_{blue})}{(R_{SWIR2} + R_{red}) + (R_{NIR} + R_{blue})} \quad (2)$$

Both equations (1) and (2) may be used to detect the pixels in an image that unlikely depict bare soil. Both equations may also be used to eliminate false positives that indicate the pixels depicting, for example, snow, and identify the pixels that depict bare soil. The approach utilizing the equations (1) and (2) is often effective and efficient for the modeling purposes.

The preprocessed data may be used to extract (706B) spectral features from the data. This may include generating a datacube representation of the data. The datacube representation is also referred to herein as a datacube. A datacube may be divided into layers at, for example, a 10-meter-wide resolution according to the resolution corresponding to, for example, bands of the Sentinel satellite data.

For the data in each datacube, a plurality of relevant indices is calculated, and a plurality of topographic and weather covariates is calculated.

In an embodiment, pixel values are extracted from each datacube for those points in the datacube for which SOM measurements are provided.

In an embodiment, extracted spectral features are combined with precipitation and temperature data 704B, terrain data 704C and, optionally, other data 704D to form a set of features 706C.

3.3.4. Calculating Spectral Indices

In an embodiment, values for certain parameters used by one or more ML models are computed. The values may include a range of standard colors, residue values, and water absorption-based spectral indices. The values may be computed using, for example, the Sentinel 2 bands that are described above, and that appear to be useful in the ML models because they are good predictors of water content and dry mass in the soil.

FIG. 8 depicts examples of vegetation indices. The figure illustrates several examples of indices 802-808. For each of the indices, an acronym is provided in column 810 and a computation formula in column 812. The depicted indices are related to soil color, water, content and residue. They may include a modified crop residue cover 802 having an acronym MCRC, a normalized difference tillage index 804 having an acronym NDTI, a normalized difference water index 806 having an acronym NDW7 and a transformed soil adjusted vegetation index 808 having an acronym TSVI.

3.4. Executing Machine Learning Models

Referring again to FIG. 7, in an embodiment, process 700 comprises executing (708) one or more ML model configured to generate soil property data based on features 706C determined in step 706.

Examples of ML models may include a Random Forest and Gaussian process-regression models. Other ML models may also be implemented.

Each of the models, such as models 708A-708C, may have evolved from each other and may include successive versions of an original model. For example, a model 708A may be a first version of the model executed based on features 706 C, a model 708B may be a second version of the model, while a model 708N may be an $n^{th}$ version of the model, and so forth.

3.4.1. Model Accuracy of Example ML Models

Many different ML models may be used to determine, or predict, subfield soil properties for a field. In an embodiment, a Gaussian process regression model is used. The Gaussian process regression model usually provides an effective method to estimate the SOM for the field, and often outperforms other models, including a Random Forest model. The Gaussian regression ML model often performs similarly for the training datasets as well as for the testing datasets. Furthermore, the Gaussian regression ML model provides the probabilistic, interpretable outputs as well as measures of how uncertain the output information is.

Once the execution of one or more ML models 708A-N on features data 706C is completed, the models generate one or more outputs. In an embodiment, the outputs include one or more mappings 710A-C of subfield soil properties data.

In an embodiment, based on mappings 710A-710C, various data is determined, displayed on display devices, and/or stored in storage devices. For example, based on subfield soil properties included in mappings 710A-710C, SOM data 710D may be derived and transmitted to, for example, a field zone delineation system.

3.4.2. Soil Organic Matter Mapping

In an embodiment, a Gaussian process regression model is executed on the features specific to an agricultural field to produce a SOM map. The SOM map may be provided in any reasonable resolution, including a 10 m resolution.

Usually, the spatial variability of the predicted 10 m resolution SOM map is difficult to assess because only the ground truth data for the grid data points is available, and the data is not spatially distributed. To solve that problem, the SmartFirmer SOM measurements may be used to augment and validate the SOM map. The SmartFirmer SOM measurements are known to provide relatively good soil mapping capability to allow to qualitatively assess the spatial distribution of the SOM maps. Other approaches may also be implemented.

3.4.3. Scaling of an Som Model

In an embodiment, a SOM map generated using a Gaussian regression ML model utilizes Sentinel2 remote sensing data. The presented approach allows to monitor the SOM levels at a scale of 10 m resolution with a high accuracy. The Gaussian ML model provides an acceptable spatial variability, and the approach has been proven to be an effective solution as it utilizes a considerable amount of available measured data. Generally, the Gaussian ML model provides good results and insights on model uncertainty.

In an embodiment, the approach provides improved capabilities that include an automated image processing of, for example, satellite imagery, and more robust training of the ML model using, for example, datasets across multiple years and multiple geographical locations. The improved capabilities may also include incorporating the environmental conditions data and providing datasets from additional sources and data repositories. Examples of the additional data sources may include the National Soil Survey Center (NSSC), Kellogg Soil Survey Laboratory (KSSL), and the USDA-NRCS Rapid Carbon Assessment (RaCA) that provide SOM data for various US agricultural regions.

In an embodiment, the approach is used to generate not only SOM maps, but also maps for other soil properties such as CEC levels, pH levels, P levels, K levels, Mg levels, Ca levels, and others.

3.4.4. Example Flow Chart

Figure 9:
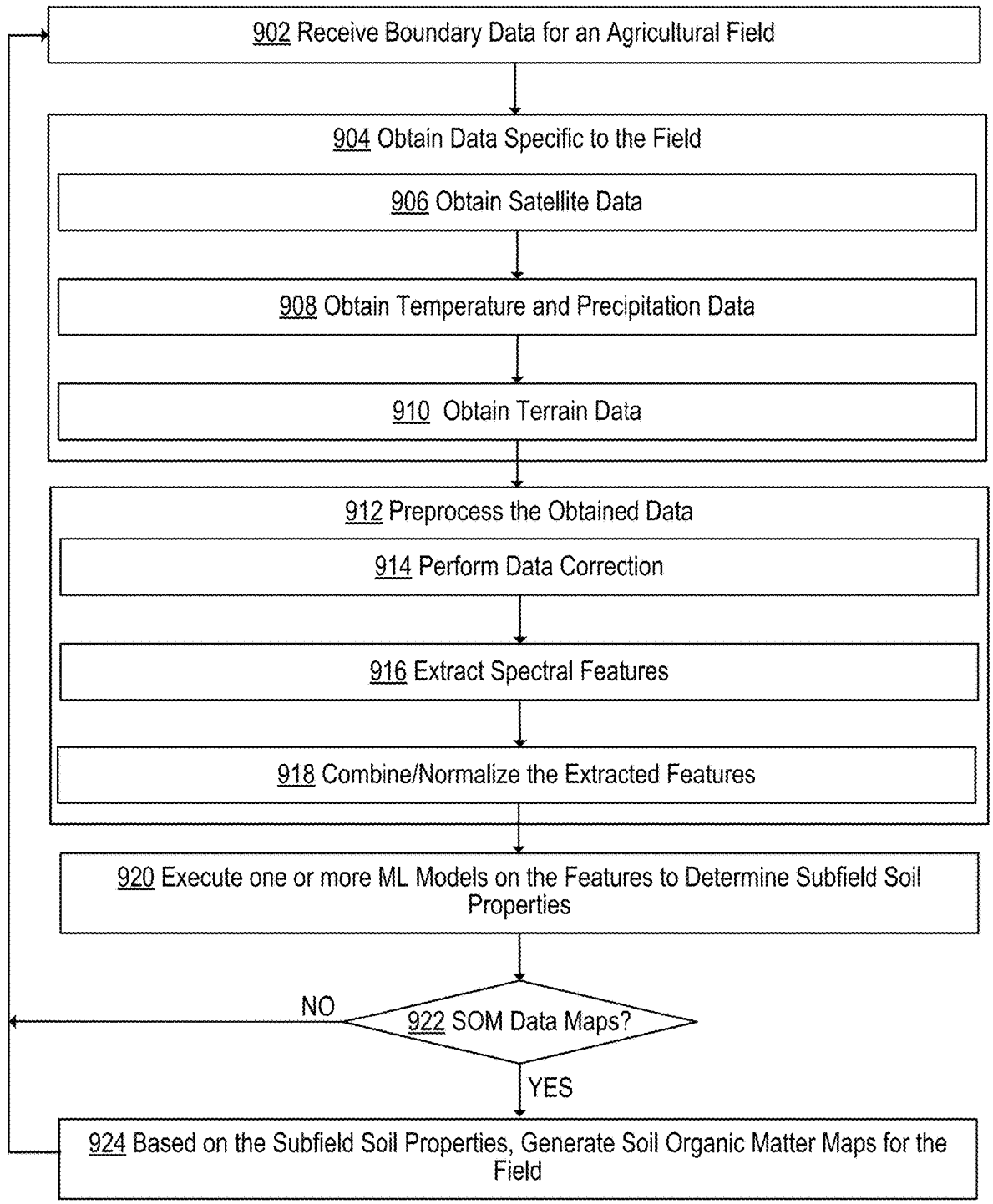
FIG. 9 depicts an example flow chart for generating soil property data using a machine learning approach.

FIG. 9 depicts an example flow chart for generating soil property data using a machine learning approach. The process depicted in FIG. 9 may be performed by one or more computer devices, computing systems, computing servers, or computing processors. For simplicity of the description, it is assumed that the steps described in FIG. 9 are performed by a computer process.

In step 902, a computer process receives boundary data for an agricultural field. The boundary data in this step corresponds to boundary data 702A described in FIG. 7. The boundary data may specify the physical boundaries of the field and may include longitudinal and latitudinal coordinate values for each end point of each leg of the field boundary. Other ways of providing the boundary data may also be implemented.

In step 904, the computer process obtains data specific to the field. This may include obtaining (906) satellite data 704A (shown in FIG. 7), obtaining (908) precipitation and temperature data 704B, obtaining (910) terrain data 704C, and any other data that may be helpful in generating the soil property data for the field.

In step 912, the computer process preprocesses the obtained data. The preprocessing may include performing (914) data correction 706A (shown in FIG. 7) of the obtained data specific to the field. This may also include extracting (916) spectral features 706B from the corrected data and combining and/or normalizing (918) the features 706C extracted from the data obtained for the field.

In step 920, the computer process executes one or more ML models on the combined/normalized features to determine subfield soil properties. In an embodiment, the ML models are used to predict various soil properties for the field. The ML models may include non-parametric ML models. Examples of non-parametric models include a Gaussian Process Regression (GPR) model. Additional models implemented in this approach may include a Random Forest (RF) model, and the like.

Examples of the ML models include models 708A-708C, shown in FIG. 7. The models may have evolved from each other and may include successive versions of an original model.

Once the execution of one or more ML models on the combined/normalized features is completed, the models generate one or more outputs. In an embodiment, the outputs include one or more mappings 710A-C (shown in FIG. 7) of subfield soil properties data.

Based on the mappings, various soil properties may be determined, displayed on display devices, and stored in storage devices. For example, based on subfield soil properties included in the mappings, SOM data may be derived and transmitted to, for example, a field zone delineation system.

In an embodiment, steps 922-924 are performed. In step 922, the computer system determines whether a request for one or more SOM data maps has been received. If the request has been received, then the computer process proceeds to performing step 924. Otherwise, the computer process proceeds to performing step 902.

In step 924, the computer process generates, based on the subfield soil properties for the field, one or more SOM maps for the field. The SOM maps may be configured to graphically depicts the levels of the soil organic matter in the field. The accuracy of the SOM maps may vary and may depend on the implementation. For example, one of the SOM maps may be provided at a 10 m resolution, while other maps may be provided at higher, or lower, resolutions.

In an embodiment, the computer process generates not only SOM maps, but also the maps for other soil properties such as CEC levels, pH levels, P levels, K levels, Mg levels, and Ca levels

4. Improvements Provided by Certain Embodiments

In an embodiment, a presented approach uses a combination of various images to determine subfield soil properties efficiently and in a relatively short period of time. The approach uses a combination of original bands images in the SWIR spectral region and with a suite of relevant indices and environmental features (such as precipitation and elevation-derived, to generate the subfield soil properties predictions. The approach solves the difficulties in using the SOM signal images with the remotely sensed spectra, and thus resulting in inaccurate prediction of the SOM using the previous attempts.

In an embodiment, a presented approach includes the training of a ML model for weather-dependent soil conditions with multi-temporal image-based features according to the temporal dynamic pattern of the soil property. This ensures a robust prediction of the subfield soil properties under different soil moisture conditions. The approach provides solutions that are easy to scale across various geographical regions and time period of interest.

What is claimed is:

1. A computer-implemented method for predicting subfield soil properties for an agricultural field, the method comprising:
   receiving satellite remote sensing data that includes a plurality of images capturing imagery of an agricultural field in a plurality of optical domains;
   receiving a plurality of environmental characteristics for the agricultural field;
   generating a plurality of preprocessed images based on the plurality of images and the plurality of environmental characteristics;
   identifying a plurality of features of the agricultural field based on the plurality preprocessed images;
   generating a subfield soil property prediction for the agricultural field by executing one or more machine learning models on the plurality of features;
   transmitting the subfield soil property prediction to an agricultural computer system.

2. The method of claim 1, wherein the generating of the plurality of preprocessed images based on the plurality of images and the plurality of environmental characteristics comprises: correcting atmospheric artifacts in the plurality of images; selecting, from the plurality of images, the plurality of preprocessed images that include pixels depicting snow-free bare soil.

3. The method of claim 1, wherein the subfield soil property prediction includes information about predicted subfield soil properties of the agricultural field; wherein the information about the predicted subfield soil properties includes information about one or more of: soil organic matter content, caution exchange capacity, potential of hydrogen, potassium, phosphorous, magnesium, or calcium.

4. The method of claim 3, further comprising: generating a plurality of subfield soil properties maps based on the information about the predicted subfield soil properties of the agricultural field; wherein the plurality of subfield soil properties maps includes one or more of: maps having different resolutions; maps depicting different soil properties, maps depicting different geographical regions, or maps depicting a geographical region at different points in time.

5. The method of claim 1, wherein the one or more machine learning models include one or more of: a Gaussian process regression (GPR) model, a random forest (RF) model, or any other non-parametric machine learning model;
   wherein the one or more machine learning models have evolved from each other and include successive versions of an original machine learning model.

6. The method of claim 1, further comprising: identifying one or more management zones within the agricultural field based on the subfield soil property prediction for the agricultural field.

7. The method of claim 1, wherein the plurality of images of the satellite remote sensing data includes one or more of: an image in a visible optical domain, an image in a near-infrared optical domain, or an image in a short-wave infrared optical domain.

8. The method of claim 1 wherein the plurality of environmental characteristics for the agricultural field includes one or more of: topographical data for the agricultural field, elevation, slope, aspect, curvature, and accumulated flow data, precipitation and temperature data accumulated during a time period during which the plurality of images was captured, long-term average daily precipitation and temperature values or absolute point-based soil sampling measurements of soil of the agricultural field.

9. The method of claim 1, further comprising: generating a plurality of uncertainty and importance indicators for inputs used to generate the subfield soil property prediction for the agricultural field by executing the one or more machine learning models on the plurality of features.

10. The method of claim 1, wherein the generating of the plurality of preprocessed images based on the plurality of images and the plurality of environmental characteristics comprises classifying images of the plurality of preprocessed images into one or more of: a no data class, a saturated pixels class, a dark features/shadows class, a cloud shadows class, a vegetation class, a bare soil class, a water class, a cloud low probability class, a cloud medium probability class, a cloud high probability class, a cirrus cloud class, or a snow/ice class.

11. One or more non-transitory computer-readable media storing one or more computer instructions which, when executed by one or more computer processors, cause the one or more computer processors to perform:
receiving satellite remote sensing data that includes a plurality of images capturing imagery of an agricultural field in a plurality of optical domains;
receiving a plurality of environmental characteristics for the agricultural field;
generating a plurality of preprocessed images based on the plurality of images and the plurality of environmental characteristics;
identifying a plurality of features of the agricultural field based on the plurality preprocessed images;
generating a subfield soil property prediction for the agricultural field by executing one or more machine learning models on the plurality of features;
transmitting the subfield soil property prediction to an agricultural computer system.

12. The one or more non-transitory computer-readable media of claim 11, wherein the generating of the plurality of preprocessed images based on the plurality of images and the plurality of environmental characteristics comprises: correcting atmospheric artifacts in the plurality of images; selecting, from the plurality of images, the plurality of preprocessed images that include field depicting snow-free soil.

13. The one or more non-transitory computer-readable media of claim 11, wherein the subfield soil property prediction includes information about predicted subfield soil properties of the agricultural field; wherein the information about the predicted subfield soil properties includes information about one or more of: soil organic matter content, caution exchange capacity, potential of hydrogen, potassium, phosphorous, magnesium, calcium, or others.

14. The one or more non-transitory computer-readable media of claim 13, storing additional instructions for: generating a plurality of subfield soil properties maps based on the information about the predicted subfield soil properties of the agricultural field; wherein the plurality of subfield soil properties maps includes one or more of: maps having different resolutions; maps depicting different soil properties, maps depicting different geographical regions, or maps depicting a geographical region at different points in time.

15. The one or more non-transitory computer-readable media of claim 11, wherein the one or more machine learning models include one or more of: a Gaussian process regression (GPR) model, a random forest (RF) model, or any other non-parametric machine learning model;
wherein the one or more machine learning models have evolved from each other and include successive versions of an original machine learning model.

16. The one or more non-transitory computer-readable media of claim 11, storing additional instructions for: identifying one or more management zones within the agricultural field based on the subfield soil property prediction for the agricultural field.

17. The one or more non-transitory computer-readable media of claim 11, wherein the plurality of images of the satellite remote sensing data includes one or more of: an image in a visible optical domain, an image in a near-infrared optical domain, or an image in a short-wave infrared optical domain.

18. The one or more non-transitory computer-readable media of claim 11 wherein the plurality of environmental characteristics for the agricultural field includes one or more of: topographical data for the agricultural field, elevation, slope, aspect, curvature, and accumulate flow data, precipitation and temperature data accumulated during a time period during which the plurality of images was captured, long-term average daily precipitation and temperature values, or absolute point-based soil sampling measurements of soil of the agricultural field.

19. The one or more non-transitory computer-readable media of claim 11, storing additional instructions for: generating a plurality of uncertainty and importance indicators for inputs used to generate the subfield soil property prediction for the agricultural field by executing the one or more machine learning models on the plurality of features.

20. The one or more non-transitory computer-readable media of claim 11, wherein the generating of the plurality of preprocessed images based on the plurality of images and the plurality of environmental characteristics comprises classifying images of the plurality of preprocessed images into one or more of: a no data class, a saturated pixels class, a dark features/shadows class, a cloud shadows class, a vegetation class, a bare soil class, a water class, a cloud low probability class, a cloud medium probability class, a cloud high probability class, a cirrus cloud class, or a snow/ice class.

* * * * *